Oct. 14, 1930.  W. DE M. GUY  1,778,188
ICE CREAM ATTACHMENT FOR MECHANICAL REFRIGERATORS
Filed July 15, 1927  2 Sheets-Sheet 1
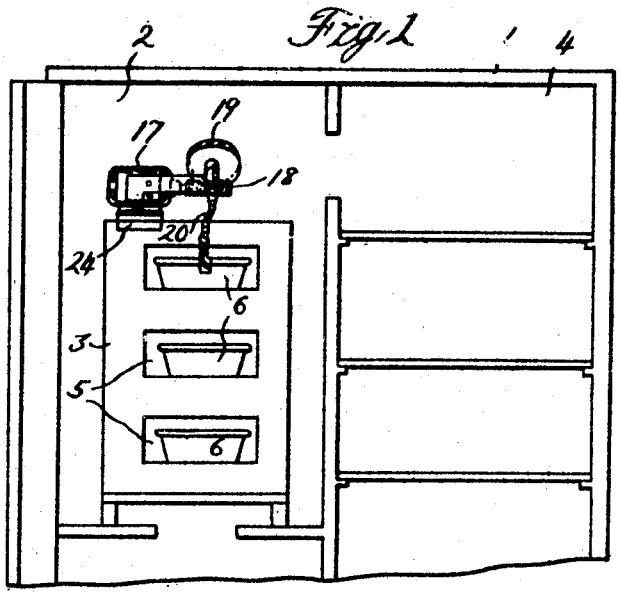
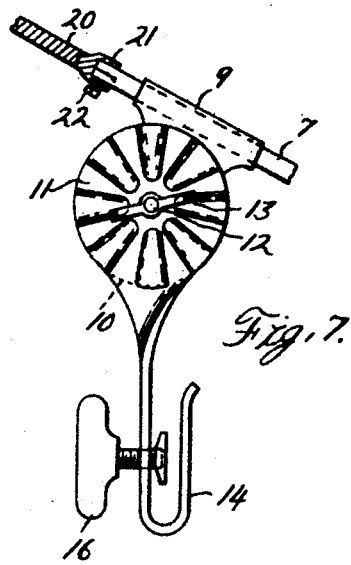
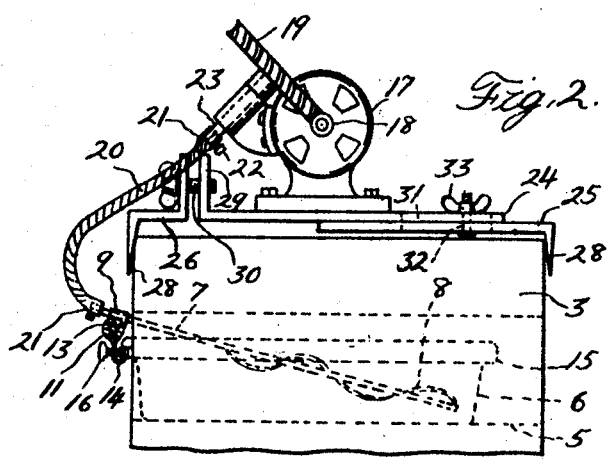
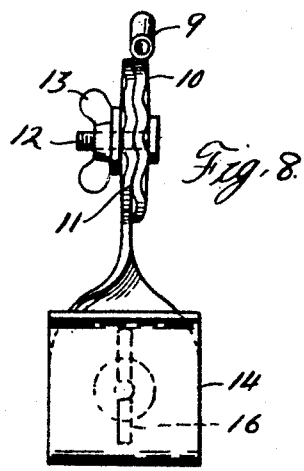
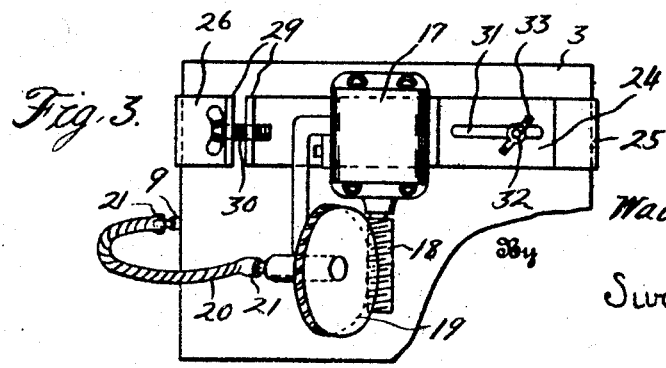
Inventor
Walter DeMotte Guy
By Swan, Frye & Murray
Attorney Oct. 14, 1930.  W. DE M. GUY  1,778,188
ICE CREAM ATTACHMENT FOR MECHANICAL REFRIGERATORS
Filed July 15, 1927  2 Sheets-Sheet 2
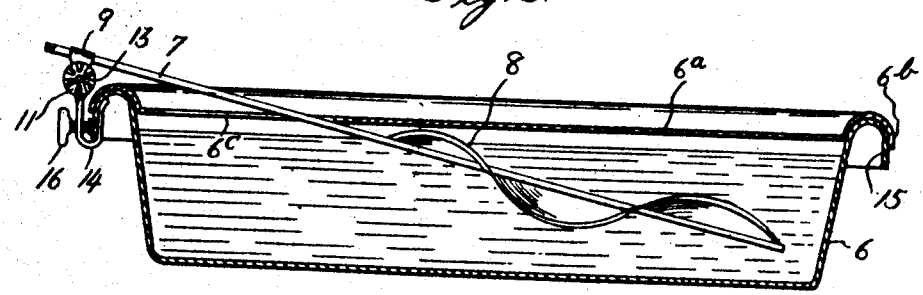
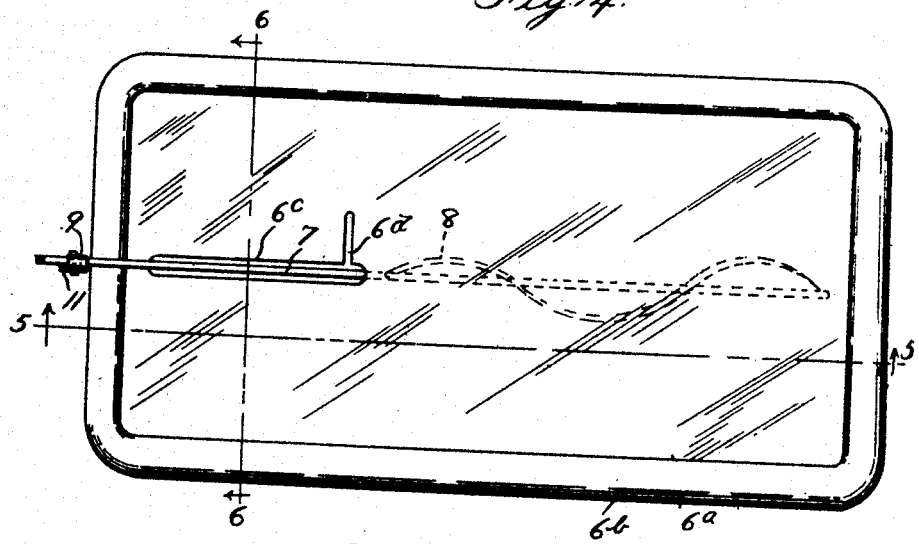
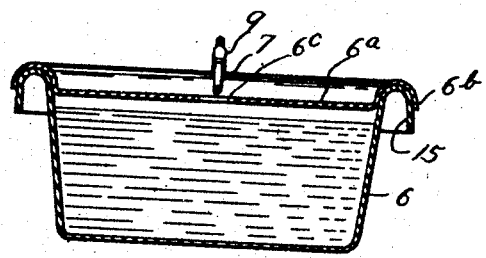
Inventor
Walter De Motts Guy
By
Swan, Frye, & Murray
Attorney Patented Oct. 14, 1930

1,778,188

UNITED STATES PATENT OFFICE

WALTER DE MOTTE GUY, OF GRAND RAPIDS, MICHIGAN

ICE-CREAM ATTACHMENT FOR MECHANICAL REFRIGERATORS

Application filed July 15, 1927. Serial No. 206,022.

This invention relates to making ice-cream and other frozen delicacies, and particularly relates to the making of ice-cream and the like in a mechanically cooled refrigerator.

An object of the invention is to provide a device for making ice-cream adapted to be readily installed as an attachment within standard types of mechanically cooled refrigerators.

Another object is to provide a unit comprising a dasher and a drive motor therefor adapted to be installed within a mechanically cooled refrigerator and adapted to make ice-cream within a standard type of vessel now employed in such refrigerators.

A further object is to adapt such a dasher by a suitable adjustment to be efficiently operated in vessels of various depths.

Still another object is to provide a dasher operating within an open-topped vessel and to quick-detachably mount said dasher upon one edge of said vessel.

These and various other objects the invention attains by the use of the construction hereinafter described and illustrated in the accompanying drawings, wherein:

Figure 1 is a view in front elevation of a mechanically cooled refrigerator equipped with the herein disclosed attachment for making ice-cream.

Figure 2 is a view in side elevation of the upper portion of the brine tank of said refrigerator showing means for clamping upon said tank a mounting for the drive motor of said attachment.

Figure 3 is a plan view of the same.

Figure 4 is a plan view of a standardized form of pan employed in a mechanically cooled refrigerator showing the same equipped with a dasher and a cover member in accordance with this invention.

Figure 5 is a longitudinal vertical sectional view of the same taken upon the line 5—5 of Figure 4.

Figure 6 is a cross sectional view of said pan taken on line 6—6 of Figure 4.

Figure 7 is a side view of a bracket adapted to be clamped upon said pan to carry a bearing for the dasher shaft.

Figure 8 is a front view of the same.

In these views the reference character 1 designates a refrigerator of the mechanically cooled type provided in its upper portion with a compartment 2 for receiving a brine tank 3, or some other mechanically cooled heat absorption element, and further containing one or more food compartments 4. The brine tank 3 as illustrated is formed with chambers 5 extending from front to back thereof, following common practice, to receive removable trays 6 which have heretofore been adapted solely for making ice or cooling other liquids or foods.

The present invention proposes to largely increase the utility of such pans by adapting a dasher 7, 8 to be mounted in one thereof for aerating an ice-cream mixture or the like. While dashers for such purpose may be variously constructed there is illustrated a dasher comprising a shaft 7 provided with a spiral rib 8. Said shaft is journaled adjacent to its front end in a bearing 9 adapted to be detachably clamped upon the forward edge of one of the pans 6. Thus said bearing is welded or otherwise mounted fast upon a radially corrugated disk 10 which together with the corresponding corrugated upper portion of a plate 11 is centrally engaged by a bolt 12 carrying a suitable wing nut 13 or the like for manually applying a clamping stress. The plate 11 is formed with a U-shaped lower portion 14 for embracing a downturned marginal flange 15 upon the pan 6 and a suitable clamping screw 16 is mounted in said portion 14 to bear upon said flange. It is evident that by unscrewing the wing nut 13 the disk 10 may be sufficiently loosened to permit its rotation upon the bolt 12, and upon tightening said wing nut the inter-engagement of the corrugations of said disk and of the plate 11 will hold said disk and the bearing 9 rigidly in a desired rotative position, thus controlling the angle of inclination of the dasher 7, 8.

Upon the brine tank 3 is surmounted an electric motor 17 from which a suitable drive connection is established to said dasher, the illustrated drive comprising a worm 18 on the motor shaft, a worm wheel 19 engaged by said worm and a flexible shaft 20 extending from said worm wheel to the dasher. Preferably said shaft is detachably connected both to the worm wheel and to the dasher shaft 7 so as to facilitate the selective use of shafts of various lengths to adapt the attachment to various sizes of brine tanks. Thus, as is best seen in Figure 2, the shaft 20 terminates in sleeve 21 adapted to be clamped by said screws 22 or the like upon the worm wheel shaft 23 and upon the dasher shaft.

It is desirable to adapt the motor 17 to be detachably mounted upon standard brine tanks of various sizes. Thus the mounting of said motor comprises a two-part clamping member 24, 25 adjustable in length and a companion clamping member 26. The members 24, 25 and 26 have down-turned ends 28 for embracing the front and rear faces of the brine tank and have their other ends upturned as indicated at 29 for engagement by clamping screws 30. The member 24 is longitudinally slotted as indicated at 31 to receive a clamping bolt 32 carried by the member 25 and a wing nut 33 engaging said bolt is adapted to apply a clamping stress for maintaining the desired elongation of the member 24, 25.

In the use of the described attachment when the motor 17 is energized the dasher 7, 8 is driven at a relatively low speed (due to the worm and worm wheel driving connection) and the ice-cream mixture or the like in the pan 6 is thus sufficiently agitated to properly aerate the same after a suitable period of operation. In case it is desired to make ice-cream in several of the pans 6 said pans may be successively disposed in the uppermost chamber 5 to receive the dasher 7, 8 and they may be replaced in the lower chambers after their contents have been sufficiently aerated by the dasher.

In some types of brine tanks there is provided a pan considerably deeper than that illustrated and in using the described attachment in connection with such a vessel the dasher 7, 8 will be adjusted at a sufficient inclination to assume a substantially central position within such pan.

When the attachment is not in use it will preferably be removed from the brine tank and stored away in any convenient place.

From the foregoing it will be evident that the described attachment is adapted to largely increase the utility of a mechanically cooled refrigerator in permitting use thereof for making ice-cream, sherbets, frozen custards, mousses and the like.

To prevent the contents of the pan 6 from being splashed over the edge thereof due to the agitating action of the dasher, it is preferred to provide said pan with a cover $6^a$ having its marginal portion downwardly flanged, as indicated at $6^b$, to fit over the flange 15 of the pan 6 and has its main body portion depressed somewhat below the level of the flange $6^b$. The front portion of said cover is formed with a central slot $6^c$ to accommodate the dasher shaft, and with a slot $6^d$ extending transversely from the slot $6^c$ to provide for withdrawal of the dasher from the pan without disturbing the cover $6^a$. The edges of the slot $6^a$ further serve to strip from the dasher any adhering portion of the mixture during such withdrawal. The depression of the main body of the cover $6^a$ below the margin of the pan increases the marginal sealing contact.

The term "brine tank", as used in this specification and the annexed claims is to be understood as designating any container for a liquid of lower freezing point than water.

What I claim is:

1. An attachment for mechanically cooled refrigerators comprising a dasher, a motor driving said dasher, a vessel in which said dasher is adapted to operate, and means for detachably mounting said motor and dasher in a refrigerator.

2. The combination with the heat absorbent element of a mechanically cooled refrigerator, of a pan aranged to be cooled by said element, a motor mounted upon said element, and a dasher driven by said motor and adapted to be mounted in said pan.

3. The combination with the heat absorbent element of a mechanically cooled refrigerator, of a pan arranged to be cooled by said element, a motor, means for detachably clamping said motor upon said element, a dasher, means for mounting said dasher upon and within said pan, and a drive connection from said motor to said dasher.

4. The combination with the heat absorbent element of a mechanically cooled refrigerator and a pan arranged to be cooled by said element, of a dasher detachably mounted upon said pan therewithin, a motor detachably mounted upon said element, and a flexible drive connection from said motor to said dasher.

5. The combination with the brine tank of a mechanically cooled refrigerator, said brine tank being formed with a cooling chamber, of a pan disposed within said chamber, a motor mounted on said brine tank, a dasher mounted upon and operable within the pan, and a drive connection from said motor to said dasher.

6. The combination with the chambered brine tank of a mechanically cooled refrigerator, of a pan disposed within said brine tank, a rotatable dasher adapted to operate within said pan, a bearing member for said dasher, means for detachably mounting said bearing member upon said pan, and actuating means for said dasher.

7. The combination with the chambered brine tank of a mechanically cooled refrigerator, of a pan disposed within the chamber of said tank, a rotatable dasher adapted to operate within said pan, a bearing for said dasher, means for clamping said bearing upon said pan, a motor for driving said dasher, means for detachably clamping said motor upon said tank, and a drive connection from said motor to said dasher.

8. The combination with a brine tank having a cooling chamber opening in a wall thereof, of a shallow pan removably mounted in said chamber, an agitator within said pan and drive means for said agitator mounted upon said brine tank.

9. The combination with a brine tank, of a vessel carried by said tank to receive a liquid to be cooled by said tank, an agitator operative within said vessel, a drive motor for said agitator, and means for detachably clamping said motor upon said brine tank.

10. The combination with a refrigerator of the mechanically cooled type, comprising an outer casing or box, of a container within said box for a cooling medium, an ice cream freezer within said box in heat-transferring proximity to said container, said freezer comprising a movable element, and drive means for said element completely disposed within said box.

11. The combination with a refrigerator of the mechanically cooled type, comprising an outer box or casing, of an ice cream freezer removably positioned within said box, and comprising a movable element, a motor disposed within said box and means establishing a quick detachable drive connection from said motor to said element.

12. The combination with a refrigerator of the mechanically cooled type, comprising a box or casing, and a tank therein for receiving a liquid of low freezing point, said tank having a chamber opening in its front wall, of an ice cream freezer removably mounted in said chamber and comprising a movable element, and drive means for said movable element mounted upon said tank, completely within said box or casing.

13. The combination with the heat absorbent element of a mechanically cooled refrigerator, of an ice cream freezer carried by and removable from said element, a motor, means detachably clamping said motor upon said element, and a drive connection from the motor to the freezer, permitting removal of the latter.

14. The combination with a heat absorbent element of a mechanically cooled refrgierator, of an ice cream freezer carried by and removable from said element, a motor carried by said element, and a speed-reducing drive connection from said motor to said freezer.

In testimony whereof I sign this specification.

WALTER DE MOTTE GUY.